US010715608B2

(12) United States Patent
Koren et al.

(10) Patent No.: US 10,715,608 B2
(45) Date of Patent: *Jul. 14, 2020

(54) AUTOMATIC SERVER CLUSTER DISCOVERY

(71) Applicant: BMC Software, Inc., Houston, TX (US)

(72) Inventors: Eyal Koren, Dafna (IL); Nitsan Daniel Lavie, Kibbutz Kfar Szold (IL); Sergey Kleyman, Kiryat Shmona (IL)

(73) Assignee: BMC Software, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,677

(22) Filed: Dec. 20, 2018

(65) Prior Publication Data

US 2019/0124162 A1    Apr. 25, 2019

Related U.S. Application Data

(63) Continuation of application No. 15/287,151, filed on Oct. 6, 2016, now Pat. No. 10,171,596.

(51) Int. Cl.
*H04L 29/08*    (2006.01)
*G06F 9/50*    (2006.01)
*H04L 12/24*    (2006.01)

(52) U.S. Cl.
CPC ............ *H04L 67/16* (2013.01); *G06F 9/5055* (2013.01); *G06F 9/5061* (2013.01); (Continued)

(58) Field of Classification Search
CPC combination set(s) only.
See application file for complete search history.

(56) References Cited

U.S. PATENT DOCUMENTS 5,781,703 A    7/1998    Desai et al.
6,002,872 A    12/1999    Alexander, III et al.
(Continued)

FOREIGN PATENT DOCUMENTS

EP    2234331 A1    9/2010

OTHER PUBLICATIONS

"BMC TrueSight Operations Management 10.0", BMC Software, Inc., Jun. 19, 2015, 874 pages.
(Continued)

*Primary Examiner* — El Hadji M Sall
(74) *Attorney, Agent, or Firm* — Brake Hughes Bellermann LLP

(57) ABSTRACT

Systems and methods provide automatic discovery of cluster membership based on transaction processing. An example method includes, at a source node of a first tier of nodes, generating a service identifier for a transaction that requests a service hosted by a second tier, the service identifier being based on a logical identifier for the second tier. The method also includes sending the transaction, including the service identifier, from the source node to the service hosted by the second tier. The method includes, at a destination node in the second tier, obtaining the service identifier from the transaction and reporting the service identifier with a destination node identifier to a visibility server as cluster information. The method also includes, at the visibility server, receiving cluster information from a plurality of destination nodes and assigning each of the plurality of destination nodes to a cluster based on the service identifiers.

20 Claims, 6 Drawing Sheets

(52) U.S. Cl.
CPC ........ *H04L 41/0893* (2013.01); *H04L 67/146* (2013.01); *G06F 2209/505* (2013.01); *H04L 67/02* (2013.01)

(56) References Cited

U.S. PATENT DOCUMENTS

| | | | |
|---|---|---|---|
| 6,965,936 B1* | 11/2005 | Wipfel | G06F 11/1482 709/201 |
| 8,438,427 B2 | 5/2013 | Beck et al. | |
| 8,683,489 B2 | 3/2014 | Dixon et al. | |
| 8,832,665 B2 | 9/2014 | Greifeneder et al. | |
| 9,015,315 B2 | 4/2015 | Bansal et al. | |
| 9,323,863 B2 | 4/2016 | Krajec et al. | |
| 2003/0084157 A1* | 5/2003 | Graupner | G06F 9/5066 709/226 |
| 2012/0317274 A1 | 12/2012 | Richter et al. | |
| 2013/0311832 A1 | 11/2013 | Lad et al. | |
| 2014/0185611 A1* | 7/2014 | Lie | H04L 49/25 370/355 |
| 2015/0012625 A1* | 1/2015 | Patwardhan | H04L 61/2015 709/221 |
| 2015/0378756 A1 | 12/2015 | Lensmar et al. | |
| 2016/0182299 A1 | 6/2016 | Polinati et al. | |

OTHER PUBLICATIONS

"Full stack application performance monitoring", Dynatrace, retrieved from <https://www.dynatrace.com/capabilities/full-stack-monitoring/> on Oct. 6, 2016, 13 pages.

"Monitoring, logging, and diagnostics for applications on Cloud Platform and AWS", Google Stackdriver, retrieved from <https://cloud.google.com/stackdriver/> on Oct. 6, 2016, 16 pages.

"Product Tour", Loggy, Inc., retrieved from <https://www.loggly.com/product/>, Oct. 2016, 17 pages.

"Using the Transaction Trace Viewer", CA Technologies, retrieved from <https://docops.ca.com/ca-apm/9-6/en/using/ca-apm-workstation-user-guide/using-the-introscope-transaction-tracer/using-the-transaction-trace-viewer>, Feb. 19, 2016, 11 pages.

Extended European Search Report for European Application No. 17194887.0, dated Feb. 27, 2018, 9 pages.

Office Action for Israeli Application No. 268670, dated Dec. 25, 2019, 5 pages.

\* cited by examiner

AUTOMATIC SERVER CLUSTER DISCOVERY

CROSS-REFERENCE TO RELATED APPLICATION

This application is a continuation of, and claims priority to, U.S. patent application Ser. No. 15/287,151, filed Oct. 6, 2016, entitled "AUTOMATIC SERVER CLUSTER DISCOVERY," the disclosure of which is incorporated by reference herein in its entirety.

BACKGROUND

In a computer system, a group of nodes, such as application servers, databases, etc., can act like a single system to enable high availability and/or load balancing and parallel processing. Because they act like a single system, a calling application typically uses a logical node identifier, i.e., a cluster identifier, to request services from the group. The group of nodes appearing as a single system can be referred to as a cluster or tier. The different nodes in the cluster may correspond to a service run on a physical or virtual machine.

Clusters are often elastic and dynamic. In other words, nodes often join the cluster or leave the cluster because of mechanical or communication failures, sometimes using an automatic cluster management system, and there is no way to know in advance which node will be added to a cluster or removed from it.

SUMMARY

Disclosed implementations provide automatic discovery of cluster membership based on transaction processing. Automatic discovery of cluster membership enables monitoring of which nodes are in which cluster(s) in any environment where nodes are added to and removed from clusters. In some implementations of systems that perform automatic discovery of node clusters, the system includes a visibility agent configured to monitor requests that are made to and/or are sent by a node. The visibility agent may determine a service identifier (e.g., "seen as" field) for a request before the node calls the next node. The service identifier is based on a logical identifier that represents how the service is seen by its clients. For example, a service identifier of an HTTP cluster may be based on the logical address of the cluster (which may include hostname, port, and in some cases path) and the service identifier for a cluster of Messaging System Subscribers may be based on the Message Queue or Topic name. In some implementations, the service identifier is a hash or other transformation of the logical identifier for the service. This service identifier is used at the visibility agent of the destination node, i.e., the node that received the request, which will process it and use it to report itself to a visibility server. The visibility server can then use this service identifier to cluster all the nodes "seen as" a particular identifier and to determine which nodes may have dropped from the cluster, for example, if they have not reported for a period of time using the service identifier.

According to one aspect, a method comprises at a source node of a first tier of nodes, generating a service identifier for a transaction, the transaction requesting a service hosted by a second tier, the service identifier being based on a logical identifier for the second tier. The method also includes sending the transaction, including the service identifier, from the source node to the service hosted by the second tier. The method includes, at a destination node in the second tier, obtaining the service identifier from the transaction and reporting the service identifier with an identifier for the destination node to a visibility server as cluster information. The method also includes, at the visibility server, receiving cluster information from a plurality of destination nodes and assigning each of the plurality of destination nodes to a cluster based on the service identifier in the cluster information.

According to an aspect, a system comprises a plurality of nodes in a distributed computing system, each node being associated with a service of at least two services, the at least two services being executed during a transaction initiated by a web browser. At least some nodes in the distributed computing environment are deployed on a server that includes at least one processor and a visibility agent including instructions that, when executed by the at least one processor, causes the visibility agent to perform operations. The operations include obtaining a first service identifier from information included in the transaction as the transaction arrives at the node, and generating a second service identifier for a service called from the node as part of the transaction. The operations also include including the second service identifier in information provided to a second service as part of the transaction, and providing the first service identifier and a node identifier for the node to a visibility server. The system also includes the visibility server, which comprises at least one processor and memory storing instructions that, when executed by the at least one processor, causes the visibility server to perform operations. The operations include receiving the service identifiers and node identifiers from the plurality of nodes and assigning each of the plurality of nodes to a cluster based on the received service identifiers.

According to another aspect, a method includes receiving, at a server, a service identifier and a node identifier pair from each of a plurality of nodes in a distributed computing system, a respective service identifier and node identifier pair being sent to the server by an agent executing on the node, the service identifier being based on a logical identifier for the node. The method may also include assigning each of the plurality of nodes to a cluster based on the service identifier.

Another aspect of the disclosure can be embodied on a computer-readable device having recorded and embodied thereon instructions that, when executed by a processor of a computer system, cause the computer system to perform any of the methods or processes disclosed herein.

One or more of the implementations of the subject matter described herein can be implemented so as to realize one or more of the following advantages. For example, automatic cluster detection enables a user to make a cleaner and easier-to-understand topology model of the application. Automatic cluster detection also provides higher accuracy in modeling and impact analysis. As another example, automatic cluster detection facilitates calculating overall statistics for a cluster, such as the load that a cluster should handle, as well as determining the general performance of a service handled by the cluster.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1:
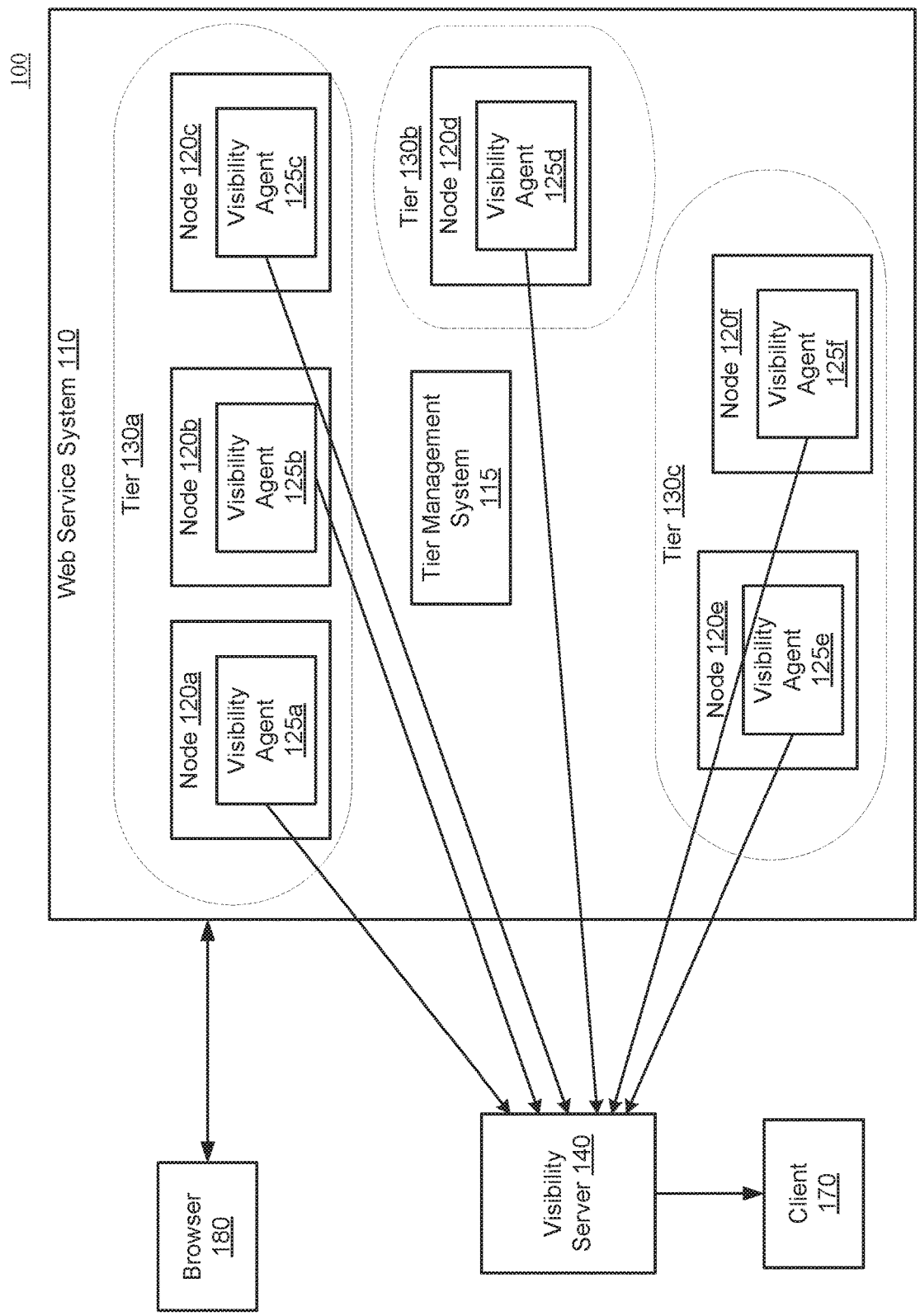
FIG. 1 is a block diagram that illustrates an automatic cluster detection system, according to an implementation.

The systems and methods described herein can be used to automatically discover cluster membership of nodes. Cluster membership can be used to generate a more accurate application topology that aids in problem detection and resolution in the various layers of the application. Implementations are most beneficial in systems where any specific node can be replaced, removed, or added to a cluster, for example by a cluster management system. In such a distributed computing environment, it may not be known which node will be in a cluster ahead of time. Monitoring cluster composition, e.g., which nodes are part of a cluster and to which cluster a node belongs, can be important because it may considerably simplify the graphic representation of the application topology, especially when multiple clusters are used and/or where clusters contain a large number of nodes. In addition, it enables better understanding of the impact of any problem encountered by individual nodes. In some implementations, the automatic cluster detection system includes visibility agents associated with the nodes in a distributed computing system. The nodes can be deployed on either physical or virtual machines, for example, servers or partitions of servers, that provide a service hosted as a cluster. For example, a server with a given Internet Protocol (IP) address or local host name may be a node, or a server may support several nodes, each with the same IP address or local host name but a different port. A node can only be assigned to one cluster within an application context because cluster management requires the ability to add or remove nodes based on needs. If a node were used in more than one cluster, then the management of one cluster would potentially affect another cluster. Therefore, node identification should take into account the underlying infrastructure.

For example, a web application may have several nodes associated with a web tier that handles HTTP (Hyper-Text Transfer Protocol) requests from web browsers, and the nodes in the web tier may call a service in a business application tier. The business application tier may handle back-end service requests made from one of the nodes in the web tier. The nodes in the web tier and business tier may change throughout the day, e.g., adding nodes to address high traffic, system availability issues, etc., or shedding nodes during periods of slow traffic. The browser does not identify and is not notified of which node in the web tier will address a particular request. Likewise, the nodes in the web tier do not identify and are not notified of which node in the business tier handles a service request sent from the web tier node to the business tier.

The visibility agent associated with a node may, upon receiving a service request (i.e., a transaction), look for a service identifier provided by the calling node and, if one is found, report that service identifier to a visibility server. A node in a web tier may generate the service identifier based on request metadata, e.g., the HTTP request metadata. Before sending a service request to another tier, the visibility agent of any node may generate a service identifier for the next tier and add the service identifier to the service request, e.g., in a transaction tag. The service identifier may thus be metadata added to the transaction and provided to the next tier. Thus, a visibility agent may first look for a service identifier and report it and, if the node with which the visibility agent is associated calls another tier, the visibility agent may also set the service identifier for the next tier. The visibility server may receive the service identifiers from the various nodes and can detect clusters based on the service identifiers. In other words, nodes reporting the same service identifiers are placed in the same clusters. The visibility server may also remove nodes from the cluster for failure to timely report a service identifier. The visibility server may use the cluster assignments for modeling and impact analysis. The visibility server may also generate a topology that is cleaner and easier to work with.

FIG. 1 is a schematic diagram that illustrates an example automatic cluster discovery system 100. In the example of FIG. 1, the automatic cluster discovery system 100 is an Internet-based system, which provides a web-based service to a user using a browser. But implementations are not limited to an Internet-based system; the techniques and processes disclosed can be applied in other similar distributed computing environments. In the example of FIG. 1, the system 100 includes a computing device running a browser 180, a web service system 110, a visibility server 140, and a client 170. The computing device running a browser 180 may be any computing device that connects to the Internet, e.g., a personal computer, a laptop computer, a tablet, a mobile phone, a smart phone, a wearable computer (e.g., a smart watch or glasses), an Internet-of-things device, etc. The browser 180 may send an HTTP request to the web service system 110 to accomplish some service or task. For example, the web service system 110 may be a store that provides a web store application. The browser 180 may access the web store application via the Internet. The web store application may offer many services, such as a login service, a search service, a purchase service, etc. The particular service requested by the browser 180 may be specified in the HTTP request provided to the web service system 110 from the browser 180. The HTTP request is considered a transaction handled by the web service system 110. Thus, all operations performed in response to a request from the browser 180, in any tier, are considered part of the transaction.

In the example of FIG. 1, the web service system 110 is a distributed computing environment, which uses many layers and multiple computing nodes to perform the operations of the web store application. Each node may be a physical or logical computing device and can be implemented on a single physical computer, e.g., a mainframe, a server, a rack of servers, or may be distributed across multiple computers. Each node may be a single computing device or a logical partition of a computing device. A computing device can include one or more processors formed in a substrate configured to execute one or more machine executable instructions or pieces of software, firmware, or a combination thereof. The computing device can include, an operating system and one or more computer memories, such as a main memory, flash memory, disk memory, etc., configured to store one or more pieces of data, either temporarily, permanently, semi-permanently, or a combination thereof. The memory may include volatile memory, non-volatile memory, or a combination thereof. A computing device can also include one or more storage mediums configured to store data in a semi-permanent or substantially permanent form.

The nodes may communicate with each other over a communications network (not shown). For example, the network can be wired or wireless and can include, a local area network (LAN), a wide area network (WAN), the Internet, etc., implemented using, for example, gateway devices, bridges, switches, and/or so forth. The network can include one or more segments and/or can have portions based on various protocols such as XCF, TCP/IP, SNA, Internet Protocol (IP) and/or other communication protocols, including a proprietary protocol. The network can include at least a portion of the Internet. Thus, the web service system 110 can include multiple computing devices and/or multiple server devices communicating over the network. In some implementations the web service system 110 includes many distributed computing devices, some of which may be operated by third parties. The web service system 110 includes a plurality of nodes. Each node 120 may take calls, or requests, for a particular service. For example, node 120a, node 120b, and node 120c may be configured to receive HTTP requests sent to one or more particular domains or URLs (Uniform Node Locators). In such an example, the node 120a, node 120b, and node 120c are included in a web tier of the distributed computing environment of the web service system 110. The web tier may be managed by a load balancer, proxy, round robin DNS, etc. A tier may also be referred to as a cluster, and is a group of nodes that act like a single system. Thus, when the browser 180 sends the HTTP request it does not identify a particular node 120; rather the HTTP request includes information that enables the proxy or load balancer for the tier to direct the request to any node 120 that is part of the tier or cluster it manages. Tiers are represented in FIG. 1 as tier 130a, tier 130b, and tier 130c.

Tiers 130 are illustrated in FIG. 1 as dashed lines because they are a logical grouping of nodes, which may be managed by a tier management system 115. The tier management system 115 may match nodes 120 to one or more tiers, depending on parameters, such as traffic, node availability, load balancing, parallel processing requirements, etc. Thus tier membership can change frequently and automatically (i.e., without user intervention) based on system parameters and performance, making it difficult to determine how an outage or problem at one particular node, e.g., node 120c, affects the web service system 110 as a whole. Even if the configuration of a cluster is done manually, the person modifying the cluster is not necessarily the same person that monitors the entire application health. This makes modeling and impact analysis difficult. The management system 115 does not always provide an actual status of cluster nodes, and in some clustering technologies such a management system does not even exist (for example—IP table, round-robin-DNS). Moreover, even if the management system 115 has the ability to reflect cluster nodes status and exposes it for external usage, querying such system would be specific to the implementation of the cluster, which requires big efforts for development and maintenance for each cluster implementation, rather than getting all applications supported in a generic way. All these reasons make the management system 115 not suitable for cluster membership discovery and status monitoring.

Implementations include a visibility agent 125 for each node 120. The visibility agent 125 may monitor the service requests received by and sent from a node. In the example of FIG. 1, node 120a has visibility agent 125a, node 120b has visibility agent 125b, etc., although in some implementations a visibility agent may monitor requests for multiple nodes. When a node, e.g., node 120e, receives a request, the visibility agent 125e may look for a service identifier provided by the calling or source node. The service identifier may have been added to transaction metadata, e.g., a transaction tag, that is included in the request by the visibility agent of the source node. For example, if node 120b, which is in the web tier 130a, calls a database tier 130c, visibility agent 125b adds the service identifier to the call before node 120b sends the request to the database tier 130c. In this example node 120b is the source node and node 120f is the destination node, although node 120b does not call node 120f directly. Rather the proxy for the database tier 130c directs the call to node 120f. The visibility agent 125b at the source node (i.e., node 120b) may generate the service identifier from metadata in the request that identifies the logical system to be called. The metadata used to generate the service identifier may be technology dependent. For example, if the call is made over HTTP, the visibility agent 125b may use the host, the host and port, or the host, port, and path as the basis for the service identifier. As another example, if the service is called using a message queue, the visibility agent 125b may use the message queue identifier as the basis for the service identifier. Other metadata may be used as appropriate for the type of service called.

The visibility agent of the destination node (i.e., node 120f in the example above) may look for the service identifier and report the service identifier along with an identifier for the node 120f to the visibility server 140. In some implementations, the visibility agent 125f may store each service identifier it encounters. The visibility agent 125f may also store metadata for the service it performs as part of the transaction, such as whether the service was successful. In some implementations the metadata for the service may be provided to the visibility server along with the service identifier. In some implementations, the visibility agent 125f may report the service identifier and node identifier (and optional service metadata) to the visibility server 140 periodically. In some implementations the visibility agent 125f may report the service identifier-node identifier pair each time a new service identifier is encountered. In other words, if the visibility agent 125f sees a service identifier that it has not encountered before or has not encountered since a predetermined period of time has elapsed (e.g., an hour), the visibility agent 125f may consider the service identifier new and may report the new service identifier to the visibility server 140. The predetermined period of time is set to a period after which the visibility server 140 may remove a node from a tier or cluster if the node has not reported that service identifier within the period. The actual amount of time in the predetermined period of time may depend on system requirements (e.g., how often the tier management system 115 reconfigures the cluster membership).

The visibility server 140 may be a computing device or devices capable of receiving service identifier pairs from all nodes 120 used by web service system 110. Although illustrated as communicatively connected the web service system 110 in FIG. 1, it is understood that the visibility server 140 may be included in the web service system 110. The visibility server 140 may receive a service identifier and a node identifier (i.e., a service identifier pair) from the nodes 120 and cluster the nodes by service identifier. For example, all nodes 120 that report the same service identifier are assigned to the same cluster. The cluster represents the nodes managed by a load balancer, proxy, round robin DNS, etc., e.g., in a tier such as tier 130b. The visibility server 140 may maintain a mapping of nodes to clusters so that the visibility server 140 can provide modeling, impact analysis, and application topology tools based on the clusters. In some implementations, the visibility server 140 may remove a node from a cluster if the node fails to report the service identifier for that cluster during a predetermined period of time. The visibility server 140 may be capable of generating a user interface that enables a user, e.g., a user using client 170 to view information about the clusters. The client 170 may be in communicative connection with the visibility server 140 via a network, such as the Internet. The client 170 may thus be any computing device able to connect to the Internet.

In the example of FIG. 1 the web service system 110 includes three tiers, represented as tier 130a, tier 130b, and tier 130c. Of course the system 100 may include many more tiers and each tier may include many more nodes then illustrated in FIG. 1. While FIG. 1 illustrates the tiers as part of web service system 110, one or more of the tiers may be remote to, but accessible by, the web service system 110. Also, a single server may support multiple nodes. For example, in FIG. 1 node 120c, which handles service calls for tier 130a and node 120d, which handles service calls for tier 130b, may be deployed on the same server. In such an implementation a single visibility agent 125 may be associated with each node supported by the server. Thus, for example, visibility agent 125c and 125d may be the same visibility agent (i.e., the visibility agent for the server) and capable of reporting more than a single service identifier pair.

Nodes in a first tier of the topology, e.g., the web tier, may need to generate their own service identifier rather than obtaining one generated at another node. This is because when a visibility agent 125 is associated with a node 120 that is in a first or top tier, the browser 180 is the source of the request, so there is no visibility agent to generate and send a service identifier for the service call. In some implementations, when the visibility agent 125 does not find a service identifier in request metadata, it may generate one for the received request. For example, if visibility agent 125c fails to find a service identifier in a transaction tag for a particular request, the visibility agent 125c may generate one using metadata from the request, e.g., from the HTTP metadata.

Figure 2:
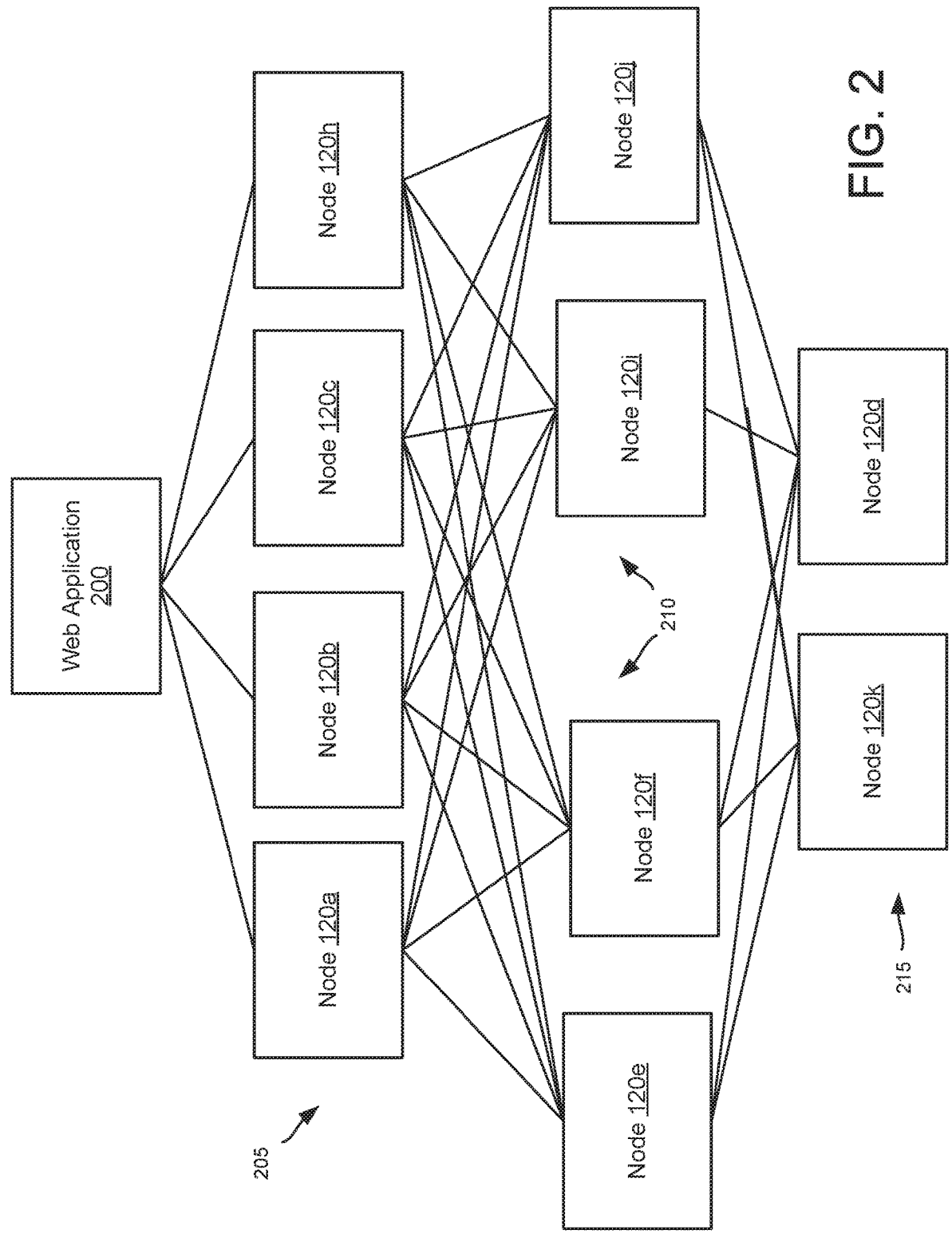
FIG. 2 is a block diagram of a topology of an example web application without cluster discovery.

FIG. 2 is a block diagram of a topology of an example web application without cluster discovery. The web application 200 may be available via a domain hosted at a server, such as web service system 110 of FIG. 1. In the example of FIG. 2, node 120a, node 120b, node 120c, and node 120h are in a web tier 205 and receive the HTTP requests made from a browser. All services performed in response to the web application request are considered a transaction. Any one of the four nodes may handle a particular request. A load balancer or proxy for the web application 200 sends the request to any one of the four nodes in the web tier 205, as shown by the connections between the web application 200 and nodes 120a, 120b, 120c, and 120h. As part of the transaction, each node in the web tier 205 may call a service hosted by a node in back-end tier 210. The back-end tier 210 includes node 120e, node 120f, node 120i, and node 120j. Any one of these four nodes may handle a particular transaction. Thus, node 120a in tier 205 may end up communicating with any one of nodes 120e, 120f, 120i, and 120j. In the example of FIG. 2, the nodes in the back-end tier 210 may make a call to a database tier 215. The database tier 215 may include node 120k and node 120d. Again, either node in the database tier 215 may end up receiving communication from any one of the nodes in back-end tier 210. That a specific node from the web tier 205 (e.g., node 120b) communicates with a specific node in the back-end tier 210 (e.g., node 120i) may be meaningless.

Figure 3:
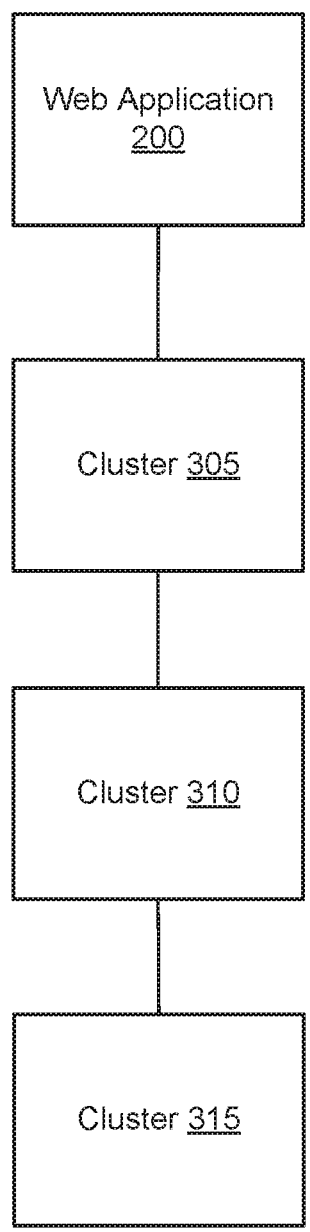
FIG. 3 is a block diagram of a topology with cluster discovery from transaction activity, according to an implementation.

FIG. 3 is a block diagram of a topology with cluster discovery from transaction activity, according to an implementation. Implementations enable a visibility server, such as visibility server 140 of FIG. 1, to discover the clusters based on service identifiers generated at a source tier and passed to a destination tier. For example, when a node in tier 205 sends a request to tier 210, the node may assign a service identifier of "210" to the request. In some implementations, this identifier may be added to a transaction tag in metadata included in the service request. The visibility agent for the node that receives the request may obtain the service identifier of "210" from the transaction tag and report it with an identifier for the node. Thus, for example, node 120i may pair the node identifier "120i" to the service identifier of "210" to send the pair {210, 120i} to the visibility server. Likewise, if node 120e receives a request it may pair "120e" with the service identifier of "210" and send the pair {210, 120e} to the visibility server. Likewise node 120f may send the pair {210, 120f} and node 120j may send the pair {210, 102j}. Thus, the visibility server may receive four different pairs from the nodes in tier 210.

When a node in the back-end tier 210 sends a request to the database tier 215 it may generate a service identifier for the database tier, e.g., "215" and set the service identifier in the transaction tag to that value. Thus, when a node in the database tier receives the transaction request it may obtain the service identifier "215" and pair it with a node identifier. Thus, if node 120d receives the request it may pair the service identifier "215" with a node identifier "120d" and send the pair {215, 120d} to the visibility server.

Because no service identifier can be generated for the transactions received at the top tier, the nodes in the topmost tier of the topology, e.g., in web tier 205, may generate a service identifier to pair with their node identifier and send to the visibility server. For example, node 120c may generate the pair {205, 120c} and report that pair to the visibility server. After receiving pairs from the different visibility agents, the visibility server may then cluster the reported pairs by service identifier and, from the clustering, generate the application topology illustrated in FIG. 3. This may be done periodically by the visibility server, e.g., after receiving periodic reports from visibility agents or on some other period. The visibility server may use the cluster membership in various ways. As non-limiting examples, the cluster membership may be used to simplify an application topology generated by transaction tracing, to collect metrics about clusters (in addition to those collected for individual nodes) and to provide more accurate problem impact analysis since the impact of a service being unavailable is not the same as a single node being unavailable.

Figure 4:
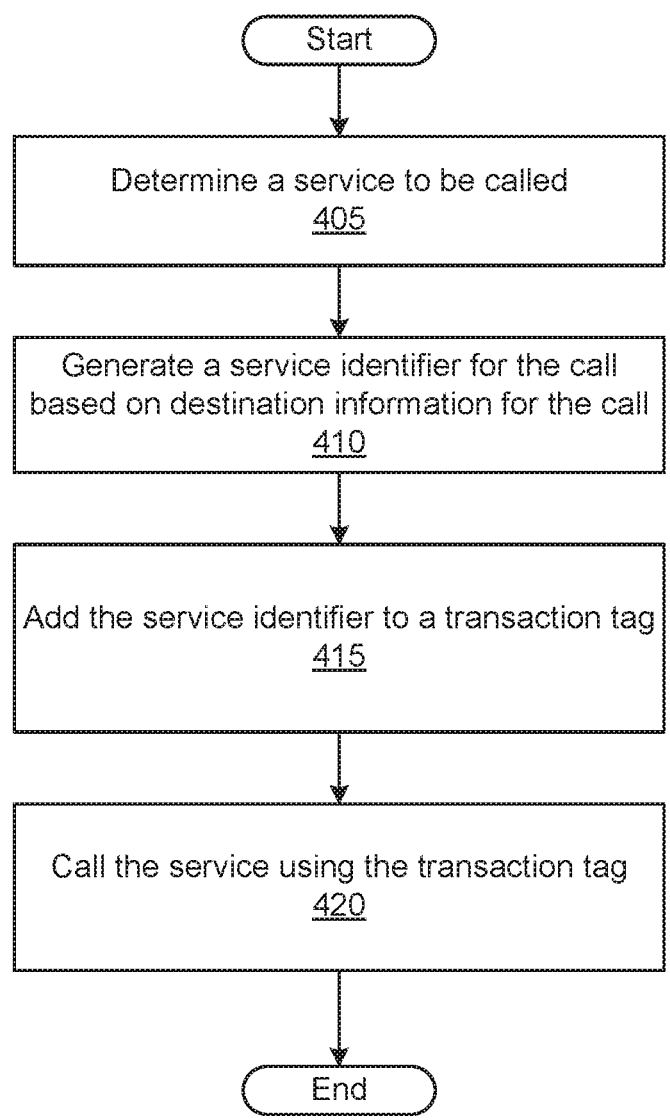
FIG. 4 is a flowchart illustrating an example process for adding a service identifier to a transaction tag, according to an implementation.

FIG. 4 is a flowchart illustrating an example process 400 for adding a service identifier to a transaction tag, according to an implementation. Process 400 may be performed by an automatic cluster discovery system, such as system 100 of FIG. 1. Specifically, process 400 may be performed at a visibility agent associated with a node in a distributed computing environment. For example, process 400 may be executed by any of the visibility agents 125 illustrated in FIG. 1. It is understood that process 400 can be run concurrently by different visibility agents and may run concurrently at the same visibility agent, e.g., if node requests a first service from a first tier in addition to requesting a second service from a second tier.

Process 400 may begin by determining a service to be called (405). A service is some process or operation that another node in the distributed computing environment performs. Thus, the current node makes a call to some other node or some logical collection of nodes, to perform the service. This logical collection of nodes is the destination of the call and the current node is the source of the call. This step may trigger or cause the visibility agent to generate a service identifier for the call (410). The service identifier may be based on destination information for the call. The destination information used to generate the service identifier can be technology-specific. In other words, the system may use different information depending on the type of call to be made. For example, a call made via an HTTP request may use a host or host and port or host and port and path to generate the service identifier; a call made via a remote procedure call (RPC) may use an interface name or interface name and method name to generate the service identifier; a call made via receiver message queue may use the name of the message queue/topic to generate the service identifier. In general, the visibility agent may use any information that represents the way the source node saw the destination when initiating the call (e.g., initiating communication with the destination) to generate the service identifier. In this sense, the service identifier may be referred to as "seen as" information or a seen-as tag. The visibility agent may transform the information to generate the service identifier, e.g., though hashing or some other transformation. In some implementations, no transformation may be applied to the information.

The visibility agent may add the service identifier generated for the service to transaction metadata to be included in the call (415). In some implementations, the service identifier may be in a transaction tag. The actual format of the service identifier, e.g., its placement in the transaction metadata, does not matter so long as the visibility agents are capable of recognizing the format. The node then calls the service and includes the transaction tag with the call (420). Thus, the source node passes the service identifier to the destination node. This enables the destination node to determine how it was seen by the source node. The destination node can then report this value to the visibility server, which may use it to determine cluster membership.

Figure 5:
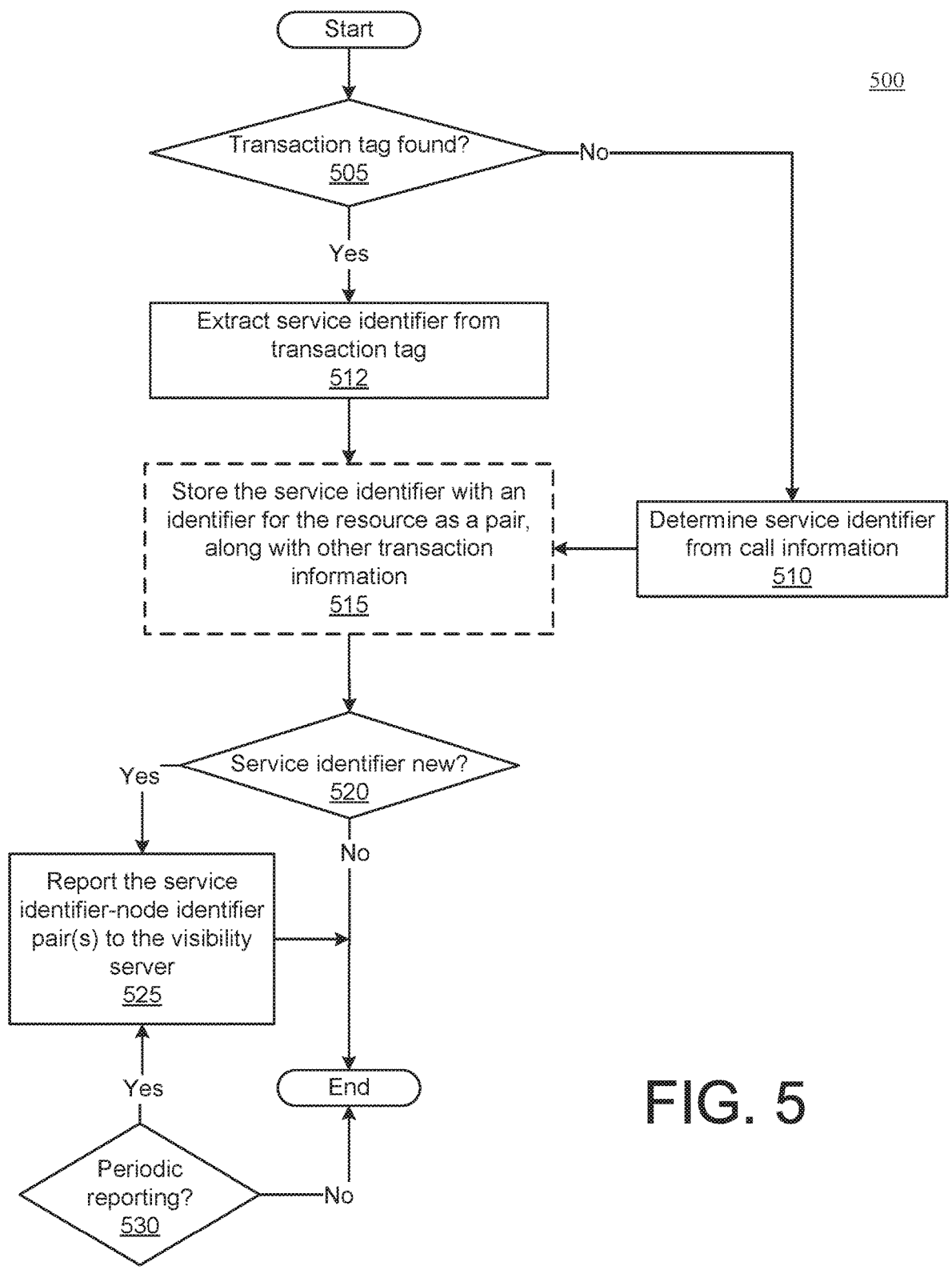
FIG. 5 is a flowchart illustrating an example process for collecting transaction activity at a node by service identifier, according to an implementation.

FIG. 5 is a flowchart illustrating an example process 500 for collecting transaction activity at a node by service identifier, according to an implementation. Process 500 may be performed by an automatic cluster discovery system, such as system 100 of FIG. 1. Specifically, process 500 may be performed at a visibility agent associated with a node in a distributed computing environment. For example, process 500 may be executed by any of the visibility agents 125 illustrated in FIG. 1 associated with a node that is a destination node, i.e., called upon to perform some service. It is understood that process 500 can be run concurrently by different visibility agents and may run concurrently on the same visibility agent.

Process 500 may begin by determining whether a transaction tag associated with a service to be performed is received from the source node (505). The transaction tag includes the service identifier set by the source node. If a transaction tag is found (505, Yes), the visibility agent extracts the service identifier from the transaction tag (512).

If no transaction tag is found (505, No), the visibility agent may determine the service identifier for itself from metadata in the call (510). No transaction tag may be present because the node is in a top tier and the top tier does not have a visibility agent to provide the service identifier. For example, the visibility agent may use the host, or host and port, or host and port and path from an HTTP request to generate the service identifier. Other tiers may also use metadata from the call to assign a service identifier if one is not provided. In some implementations, the visibility agent for a particular node may be capable of always providing the service identifier. For example, a visibility agent in a target node in a database tier may use the combination of a database schema and database table as the service identifier, regardless of whether a service identifier was provided by a source node.

Once the system has a service identifier (after 510, or 512), the system may optionally store the service identifier with an identifier for the node as a pair (515). The system may store the pairs for periodic reporting. For example, the visibility agent may periodically report service identifier-node identifier pairs it encountered during a previous period, e.g., every minute, every five minutes, every hour, etc. To accomplish such periodic reporting, the system may store the service identifiers encountered. In addition the system may store additional transaction information, such as an identifier for the transaction, whether the service was successful or not, how long it took to complete the service, etc. Such data can be reported with the service identifier-node identifier pair to the visibility server and may aid in diagnosing system issues. In some implementations, once the pairs are reported to the visibility server they are deleted. The node identifier is an identifier that uniquely identifies the node, depending on the context of the nodes within the cluster. For example, if nodes can be mapped to entire servers, the node identifier can be a unique server identifier such as an IP address of the server hosting the node or the local host name of that server, provided that the latter resolves only to the IP address of the server; if the nodes are mapped to application servers, some of which can be installed alongside each other on the same server, each listening on a different port, then a good node identifier would be the server IP address or local hostname in combination with the port number.

In some implementations, the system may determine whether the service identifier is new (520). A service identifier is new when the visibility agent has not encountered that service identifier before or has not encountered that service identifier since a specific time (e.g., in the last hour, the last day, the last 15 minutes, etc.). The specific time may be a parameter set by an administrator or other user. If the service identifier is not new (520, No), process 500 may end. If it is new (520, Yes), the system may immediately report the service identifier-node identifier pair to the visibility server (525). Thus the visibility service is kept up-to-date on which nodes are paired with (or "seen as") which logical clusters.

In some implementations, the visibility agent may do periodic reporting (530). For example, the visibility agent may report every one minute, regardless of whether a new service identifier has been seen during that period. In other words, every period (e.g., every minute, every five minutes, etc.) the visibility agent may report what it has seen, even if the service identifier is not new. In this way, the visibility agent can ensure that the visibility server does not think its associated node has been dropped from the cluster due to inactivity. If it is time for periodic reporting (530, Yes), the visibility agent may report the service identifiers it has encountered since the last report (525). In some implementations, any stored information about the service identifier-node identifier pairs may be deleted after the reporting. Process 500 then ends.

Figure 6:
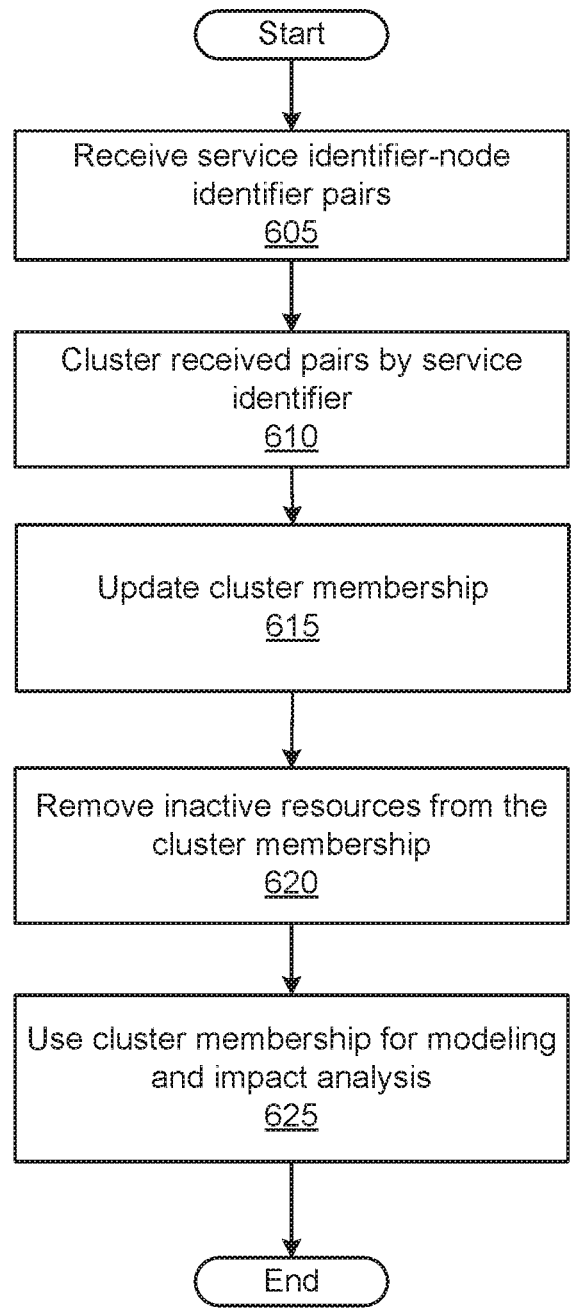
FIG. 6 is a flowchart illustrating an example process for cluster discovery from transaction activity, according to an implementation.

FIG. 6 is a flowchart illustrating an example process 600 for cluster discovery from transaction activity, according to an implementation. Process 600 may be performed by an automatic cluster discovery system, such as system 100 of FIG. 1. Specifically, process 600 may be performed at a visibility server that receives service identifier-node identifier pairs from a plurality of visibility agents in a distributed computing environment. For example, process 600 may be executed by the visibility server 140 illustrated in FIG. 1. Process 600 may be run periodically to automatically determine cluster membership of the nodes associated with an application or process 600 can be run each time a service identifier-node identifier pair is received.

Process 600 may begin by receiving service identifier-node identifier pairs, from a plurality of visibility agents associated with nodes handling requests routed through a round robin DNS, load balancer, proxy, etc. (605). The service identifier is based on a logical identifier for the service hosted as a cluster. In other words, the calling or source node sends the request to the tier using a logical identifier. The service identifier is based on the logical identifier, for example the service identifier may be a hash of the host name, a hash of the host name and port, etc. As another example, the service identifier may be some other conversion of the logical identifier. The node identifier is an identifier unique to the node that actually ended up receiving the request, e.g., the node selected by the proxy. The pairs may be provided explicitly, e.g., when a visibility agent reports a new service identifier. The pairs may also be provided implicitly, e.g., when a visibility agent does periodic reporting, it may report its node identifier once and a set of service identifiers encountered since a previous reporting. Each service identifier in the set is considered paired with the node identifier. The system may cluster the received pairs by service identifier (610). Thus, all pairs for the same service identifier may end up in the same cluster. In some implementations, clustering may occur based on an intersection of reported service identifiers. Thus, for example, a service called through a short logical domain name and through a fully qualified domain name may be put in the same cluster. In other words, the system may cluster by partial service identifier, which results in fewer clusters than clustering by an exact match of the entire service identifier. The system may update the cluster membership (615) to add any new nodes to the cluster. For example, the visibility server may keep a mapping of nodes to clusters (or vice versa) in a database or file. In some implementations, the visibility server may replace any mapping with the membership determined by clustering the received pairs. In some implementations, the visibility server may add newly identified nodes to the mapping. In such implementations, the visibility server may remove inactive nodes from the cluster membership (620). For example, if the visibility server fails to receive a pair from a particular node during a period of time, the visibility server may consider the node inactive in that cluster and may remove the mapping of the node to the cluster. In other words, failure to report a service identifier within some predetermined period of time may result in automatic deletion from the cluster.

The visibility server may use the cluster membership information in modeling and impact analysis (625). For example, the visibility server can collect other metrics by node identifier (e.g., via transaction tracing) and use the cluster membership to report the metrics, to present a system topology to the user, or even to create alerts when a particular node is added to or dropped from a cluster. The visibility server may thus include a user interface capable of receiving input from a user and providing models and impact analysis to the user using the cluster memberships.

Method steps may be performed by one or more programmable processors executing a computer program to perform functions by operating on input data and generating output. Method steps also may be performed by, and an apparatus may be implemented as, special-purpose logic circuitry (e.g., an FPGA (field programmable gate array) or an ASIC (application-specific integrated circuit)).

Processors suitable for the processing of a computer program include, by way of example, both general and special-purpose microprocessors (e.g., processors formed in a substrate), and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data (e.g., magnetic, magneto-optical disks, or optical disks). Information carriers suitable for embodying computer program instructions and data include all forms of non-volatile memory, including by way of example semiconductor memory devices (e.g., EPROM, EEPROM, and flash memory devices; magnetic disks (e.g., internal hard disks or removable disks); magneto-optical disks; and CD-ROM and DVD-ROM disks. The processor and the memory may be supplemented by, or incorporated in special-purpose logic circuitry.

To provide for interaction with a user, implementations may be implemented on a computer having a display device (e.g., a cathode ray tube (CRT), a light emitting diode (LED), or liquid crystal display (LCD) display device) for displaying information to the user and a keyboard and a pointing device, e.g., a mouse or a trackball, by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

Implementations may be implemented in a computing system that includes a back-end component (e.g., as a data server), or that includes a middleware component (e.g., an application server), or that includes a front-end component (e.g., a client computer having a graphical user interface or a Web browser through which a user can interact with an implementation), or any combination of such back-end, middleware, or front-end components. Components may be interconnected by any form or medium of digital data communication (e.g., a communication network). Examples of communication networks include a local area network (LAN) and a wide area network (WAN) (e.g., the Internet).

While certain features of the described implementations have been illustrated as described herein, many modifications, substitutions, changes, and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described.

According to one aspect, a method comprises at a source node of a first tier of nodes, generating a service identifier for a transaction, the transaction requesting a service hosted by a second tier, the service identifier being based on a logical identifier for the second tier. The method also includes sending the transaction, including the service identifier, from the source node to the service hosted by the second tier. The method includes, at a destination node in the second tier, obtaining the service identifier from the transaction and reporting the service identifier with an identifier for the destination node to a visibility server as cluster information. The method also includes, at the visibility server, receiving cluster information from a plurality of destination nodes and assigning each of the plurality of destination nodes to a cluster based on the service identifier in the cluster information.

These and other aspects may include one or more of the following features. For example, the source node may be absent from the second tier. As another example, the first tier may differ from the second tier. As another example, the service identifier is a first service identifier and the method further comprises, at the destination node in the second tier, generating a second service identifier for the transaction, the transaction calling a second service hosted by a third tier, the second service identifier being based on a logical identifier for the third tier. The method also includes replacing the first service identifier with the second service identifier in the transaction and sending the transaction, including the second service identifier, to the second service hosted by the third tier. The method further includes, at a second destination node in the third tier, obtaining the second service identifier from the transaction, and reporting the second service identifier with an identifier for the second destination node to the visibility server.

As another example, the first tier may represent a web service, the service identifier may be a second service identifier, and the method further comprises, prior to generating the second service identifier, generating a first service identifier at the source node for the transaction, the first service identifier being a logical identifier for the first tier, and reporting the first service identifier and an identifier for the source node to the visibility server. In some implementations, generating the first service identifier can include setting the first service identifier based on metadata in a Hyper-Text Transfer Protocol request for the transaction.

As another example, reporting the service identifier occurs responsive to determining that the service identifier is new to the destination node and/or determining that a period of time since a previous reporting has elapsed. In some implementations, the method may also include determining, at the visibility server, that a third node is currently assigned to a second cluster, determining that at the third node has not reported the service identifier for the second cluster within a predetermined amount of time, and removing the assignment of the third node to the second cluster.

As another example, generating the service identifier includes generating the service identifier from a host and a port for the service, generating the service identifier from a host, port, and path for the service, generating the service identifier from a hash of the host, and/or generating the service identifier from a message queue used by the service.

According to an aspect, a system comprises a plurality of nodes in a distributed computing system, each node being associated with a service of at least two services, the at least two services being executed during a transaction initiated by a web browser. At least some nodes in the distributed computing environment are deployed on a server that includes at least one processor and a visibility agent including instructions that, when executed by the at least one processor, causes the visibility agent to perform operations. The operations include obtaining a first service identifier from information included in the transaction as the transaction arrives at the node, and generating a second service identifier for a service called from the node as part of the transaction. The operations also include including the second service identifier in information provided to a second service as part of the transaction, and providing the first service identifier and a node identifier for the node to a visibility server. The system also includes the visibility server, which comprises at least one processor and memory storing instructions that, when executed by the at least one processor, causes the visibility server to perform operations. The operations include receiving the service identifiers and node identifiers from the plurality of nodes and assigning each of the plurality of nodes to a cluster based on the received service identifiers.

These and other aspects may include one or more of the following features. For example, the second service identifier can be based on a host and port for the service called from the node. As another example, generating the second service identifier may include setting the second service identifier using a message queue used by the service called from the node. As another example, obtaining the first service identifier includes setting the first service identifier using metadata in a Hyper-Text Transfer Protocol request for the transaction, and/or obtaining the first service identifier from a transaction tag added to the transaction by another visibility agent. In some implementations, including the second service identifier in information provided to a second service includes replacing the first service identifier in the transaction tag with the second service identifier prior to providing the information to the second service.

As another example, providing the first service identifier and the node identifier to the visibility server can include determining that the first service identifier is new to the node and providing the first service identifier responsive to the determining. As another example, providing the first service identifier and the node identifier to the visibility server may include determining that a predetermined amount of time since a last providing has elapsed, and providing the first service identifier responsive to the determining.

According to another aspect, a method includes receiving, at a server, a service identifier and a node identifier pair from each of a plurality of nodes in a distributed computing system, a respective service identifier and node identifier pair being sent to the server by an agent executing on the node, the service identifier being based on a logical identifier for the node. The method may also include assigning each of the plurality of nodes to a cluster based on the service identifier.

What is claimed is:

1. A non-transitory computer-readable medium storing instructions that, when executed by at least one processor of a verification server, causes the verification server to perform operations including:

receiving service-node pairs from each of a plurality of nodes in a distributed computing system, a service identifier of a service-node pair representing how a called service is seen by a requestor of the service when initiating the call and a node identifier of the service-node pair identifying the node executing the service;

assigning each of the plurality of nodes to one cluster of a plurality of clusters based on the service identifiers in the service-node pairs; and using the plurality of clusters in impact analysis or modeling.

2. The non-transitory computer-readable medium of claim 1, wherein the operations further include:

receiving a service-node pair from a first node;

determining that the first node is currently assigned to a first cluster, the first cluster differing from a second cluster, wherein the second cluster is associated with the service identifier of the service-node pair received from the first node; and changing the assignment of the first node from the first cluster to the second cluster.

3. The non-transitory computer-readable medium of claim 1, wherein the operations further include:

determining that a first node is currently assigned to a first cluster;

determining that an identifier for the first node has not appeared in a service-node pair received within a predetermined amount of time; and removing the assignment of the first node to the first cluster.

4. The non-transitory computer-readable medium of claim 3, wherein the operations further include:

generating an alert responsive to removing the assignment.

5. The non-transitory computer-readable medium of claim 1, wherein a service-node pair is sent to the verification server by a visibility agent for a particular node, the service identifier being based on a logical identifier for the particular node.

6. The non-transitory computer-readable medium of claim 1, wherein the impact analysis or modeling includes calculating a load for at least some of the clusters.

7. The non-transitory computer-readable medium of claim 1, wherein the operations further include generating a topology based on the service identifiers.

8. The non-transitory computer-readable medium of claim 1, wherein the operations further include generating a user interface that displays information about the clusters.

9. The non-transitory computer-readable medium of claim 1, wherein using the plurality of clusters in impact analysis or modeling includes:

collecting at least a metric for each node via transaction tracing; and using cluster assignments to report the metric.

10. A distributed computing system running a web service, the distributed computing system comprising:

at least one processor;

a plurality of nodes;

a first tier associated with a first service, the first tier including at least a first node of the plurality of nodes and a first visibility agent, the first service being configured to receive HTTP (Hyper-Text Transfer Protocol) requests from a web browser identifying the web service and the first visibility agent being configured to perform operations including:

generating a first service identifier from metadata for a particular HTTP request received by the first node, reporting the first service identifier and an identifier for the first node to a visibility server as a first service-node pair, generating a second service identifier for a second service hosted by a second tier of nodes, the second service identifier being based on a logical identifier for the second tier, and including the second service identifier in a request for the second service made from the first node; and the second tier associated with the second service, the second tier including a second visibility agent and at least a second node of the plurality of nodes, the second node receiving the request, the second visibility agent being configured to, responsive to receiving the request for the second service, perform operations including:

identifying the second service identifier in the request for the second service, and reporting the second service identifier and an identifier for the second node to the visibility server as a second service-node pair, wherein the visibility server assigns nodes to a cluster based on service-node pairs reported.

11. The computing system of claim 10, wherein the first visibility agent operates as the second visibility agent.

12. The computing system of claim 10, wherein the particular HTTP request is assigned a transaction identifier and the request for the second service includes the transaction identifier.

13. The computing system of claim 10, wherein generating the first service identifier includes:

hashing the metadata for the particular HTTP request.

14. The computing system of claim 10, wherein reporting the first service identifier occurs responsive to determining that the service identifier is new to the second node.

15. The computing system of claim 10, wherein reporting a service identifier occurs responsive to determining that a period of time since a previous reporting of the service identifier has elapsed.

16. The computing system of claim 10, wherein the metadata includes a host name, a host name and a port, or a host name, a port, and a path.

17. The computing system of claim 10, wherein the logical identifier for the second tier includes an interface name.

18. A method comprising:

receiving an HTTP (Hyper-Text Transfer Protocol) request from a browser at a first node of a plurality of nodes, the first node being associated with a web service initiated by the HTTP request;

generating a first service identifier from metadata for the HTTP request;

reporting the first service identifier and an identifier for the first node to a visibility server as a first service-node pair;

generating a second service identifier for a second service, the second service identifier being based on a logical identifier for the second service, and calling the second service from the first node, the call including the second service identifier, wherein a second node of the plurality of nodes that is associated with the second service reports the second service identifier and an identifier for the second node to the visibility server as a second service-node pair, wherein the visibility server uses the service-node pairs to assign nodes to clusters and use the clusters in impact analysis or modeling.

19. The method of claim 18, wherein generating the second service identifier includes:
 setting the second service identifier using a message queue used by the second service.

20. The method of claim 18, wherein reporting the first service-node pair to the visibility server includes:
 determining that a predetermined amount of time since a last reporting has elapsed; and
 reporting the first service-node pair responsive to the determining.

* * * * *